(12) United States Patent
Christensen (10) Patent No.: US 9,036,681 B2
(45) Date of Patent: May 19, 2015

(54) METHOD, APPARATUS AND COMPUTER PROGRAM FOR CONTROLLING A RECEIVER

(71) Applicant: Broadcom Corporation, Irvine, CA (US)

(72) Inventor: Lars Puggaard Bogild Christensen, Charlottenlund (DK)

(73) Assignee: BROADCOM CORPORATION, IRVINE, CA (US)

( * ) Notice: Subject to any disclaimer, the term of this patent is extended or adjusted under 35 U.S.C. 154(b) by 0 days.

(21) Appl. No.: 14/046,071

(22) Filed: Oct. 4, 2013

(65) Prior Publication Data

US 2014/0098840 A1 Apr. 10, 2014

(30) Foreign Application Priority Data

Oct. 5, 2012 (GB) .................................. 1217850.5

(51) Int. Cl.
*H04B 1/7103* (2011.01)
*H04B 1/7105* (2011.01)

(52) U.S. Cl.
CPC ............ *H04B 1/7103* (2013.01); *H04B 1/7105* (2013.01)

(58) Field of Classification Search
USPC ......................................... 375/148, 144, 149
See application file for complete search history.

(56) References Cited

U.S. PATENT DOCUMENTS

| 7,483,480 | B2 * | 1/2009 | Guo et al. ...................... 375/232 |
| 7,957,485 | B2 * | 6/2011 | Cairns et al. .................. 375/267 |
| 2008/0089403 | A1 * | 4/2008 | Hooli et al. .................... 375/232 |
| 2008/0130777 | A1 * | 6/2008 | Landau et al. ................. 375/267 |
| 2010/0080277 | A1 * | 4/2010 | Yang et al. ..................... 375/232 |

OTHER PUBLICATIONS

Shakti Prasad Shenoy, Irfan Ghauri, Drik T.M. Slock; Chip-Sparsification and Symbol-Equalization for WCDMA Downlink; IEEE 2008 (6 pages).

(Continued)

*Primary Examiner* — Qutbuddin Ghulamali
(74) *Attorney, Agent, or Firm* — Oblon, McClelland, Maier & Neustadt, L.L.P.

(57) ABSTRACT

Linear symbol level equalisation is used to estimate a transmitted symbol vector $x_n^{(0)}$ in an nth observation window $y_n$ of signals received from multiple users each using a different spreading code. An iterative conjugate gradient algorithm resolves a column vector z that satisfies Az=b, A being a square matrix and b being a column vector. The matrix vector product $Ap_k$ used in each respective kth iteration of the algorithm is computed using at least one fast transform. The receiver or detector estimates a posterior mean $\hat{x}_{LMMSE,n}^{(0)}$ from the computed column vector z, then utilises the estimated posterior mean to determine the transmitted symbol vector $x_n^{(0)}$. The posterior mean $\hat{x}_{LMMSE,n}^{(0)}$ may be estimated from matrix A and vector b. Different examples have the square matrix A with an inner or an outer product form; and have the fast transform as a fast Walsh-Hadamard transform and/or a fast (inverse) Fourier transform.

20 Claims, 2 Drawing Sheets

(56) References Cited

OTHER PUBLICATIONS

Jun Tong and Peter J. Schreier; Regularized Linear Equalization for Multipath Channels With Imperfect Channel Estimation; ICASSP 2012 (4 pages).

Y. Guo, D. McCain, J. R. Cavallaro, "FFT-Accelerated Iterative MIMO Chip Equalizer Architecture for CDMA Downlink," IEEE International Conference on Acoustics, Speech, and Signal Processing (ICASSP), vol. 3, pp. 1005-1008, Mar. 2005 (4 Pages).

M. Vollmer, M. Haardt and J. Gotze, "Comparative study of joint-detection techniques for TD-CDMA based mobile radio systems" [IEEE Journal on Selected Areas in Communications, Aug. 2001 (15 pages).

C. B. Tjitrosoewarno, A. Fukasawa, and Y. Takizawa, entitled "Multi-user receiver using conjugate gradient method for wideband CDMA" [IEEE ISCAS, May 2005] (4 pages).

A. Al Housseini, Th. Chonavel, T. Saoudi and M. Ammar; "Multi-user Detection in DS_CDMA Systems: a Conjugate-gradient implementation" [IEEE VTC Spring 2003] (4 pages).

* cited by examiner

METHOD, APPARATUS AND COMPUTER PROGRAM FOR CONTROLLING A RECEIVER

TECHNICAL FIELD

The present invention relates to a method, apparatus and a computer program for controlling a receiver. The exemplary and non-limiting embodiments of this invention relate generally to wireless receivers, methods, devices and computer programs and, more specifically, relate to symbol-level equalisation at the receiver.

BACKGROUND

In cellular radio systems that utilise a code division multiple access (CDMA) scheme, the transmissions from multiple users are sent simultaneously over the communication media and these different signals are distinguished from one another by the spreading codes. Typically orthogonal spreading codes are assigned to the different users of the system which makes it simple to separate the users at the receiver side. However, orthogonality between spreading codes may be lost if the transmissions occur over a frequency-selective channel such as a wireless radio channel having multiple propagation paths. In conditions such as these where the orthogonality between the codes and therefore the users is lost, the task of optimally separating the users at the receiving side is significantly more complicated.

In general, the complexity of performing optimal multiuser detection under such conditions grows exponentially with the number of active users. Approximate solutions to this detection problem therefore have to be targeted by real-life implementations. One important class of such approximate detectors is that of the linear detectors, which in basic terms approximate the true discrete-valued symbol prior distribution with a Gaussian prior distribution. This eliminates the combinatorial nature of the optimal detection problem.

For CDMA systems there are two distinct sub-classes of such linear detection. The first sub-class is that of linear chip-level equalisation, which in essence considers the transmitted chips as being independent in order to make implementation easier. The second sub-class is that of linear symbol-level equalisation which accounts for the coupling between the transmitted chips due to the spreading codes, resulting in optimal linear processing. As a result, linear symbol-level equalisation can achieve much better performance compared to that of linear chip-level equalisation, but this typically comes at the cost of significant additional computational complexity. This is especially true in CDMA systems such as 3rd Generation Partnership Project (3GPP) wideband CDMA (WCDMA) and high speed downlink packet access (HSDPA) systems, where the scrambling code has a very long period compared to the length of the spreading codes which requires that the symbol-level equalisation coefficients be recomputed for each use.

In practice the chip-level equalisation has generally been the norm in many CDMA systems, since the complexity of symbol-level equalisation has typically been out of reach for practical implementations.

It is well-known that optimal detection in CDMA systems generally requires joint detection over all active users and codes. If all active spreading codes and associated constellation types are known to the receiver, optimal detection is possible by basically searching for the combination that maximises the likelihood of the transmitted sequence of data symbols. Such an exhaustive search over the discrete space of all possible data symbol combinations is exponentially complex in the number of users and codes and is therefore out of reach for practical CDMA implementations. Instead, various sub-optimal approximate joint detection schemes have been conceived and these are typically classified by whether non-linear and linear operations are performed. Examples of approximate detectors based on linear processing are rake, chip- and symbol-level LMMSE (linear minimum mean squared error) equalisers, whereas examples of non-linear approximations include sphere detection and serial/parallel interference cancellation schemes.

An example of an efficient chip-level LMMSE equalisation implementation exploiting fast Fourier transforms (FFTs) is described in a paper by Y. Guo, D. McCain and J. R. Cavallaro, entitled *"FFT-Accelerated Iterative MIMO Chip Equalizer Architecture For CDMA Downlink"* [IEEE ICASSP, March 2005]. Approximations for a symbol-level LMMSE equalisation may be seen in a paper by M. Vollmer, M. Haardt and J. Gotze, entitled *"Comparative study of joint-detection techniques for TD-CDMA based mobile radio systems"* [IEEE Journal on Selected Areas in Communications, August 2001]. Also, solving the linear system of equations that arise for linear joint detection in a CDMA system using non-orthogonal spreading codes over a frequency-flat channel can be seen in a paper by C. B. Tjitrosoewarno, A. Fukasawa, and Y. Takizawa, entitled *"Multi-user receiver using conjugate gradient method for wideband CDMA"* [IEEE ISCAS, May 2005]. Finally, using the conjugate gradient algorithm for solving the linear system of equations that arise in an asynchronous CDMA system operating in a multipath channel is considered in a paper by A. Al Housseini, Th. Chonavel, T. Saoudi and M. Ammar entitled *"Multi-user Detection in DS_CDMA Systems: a Conjugate-gradient implementation"* [IEEE VTC Spring 2003].

SUMMARY

According to a first aspect of the present invention, there is provided a method for using linear symbol level equalisation to control a receiver to estimate a transmitted symbol vector $x_n^{(0)}$ in an nth observation window $y_n$ of signals received from multiple users each using a different spreading code. In this aspect the method comprises: utilising an iterative conjugate gradient algorithm to resolve a column vector z that satisfies $Az=b$, where A is a square matrix and b is a column vector, in which a matrix vector product $Ap_k$ used in each respective kth iteration of the iterative conjugate gradient algorithm is computed using at least one fast transform, in which $p_k$ is a conjugate vector for the kth iteration; estimating a posterior mean $\hat{x}_{LMMSE,n}^{(0)}$ from the column vector z; and utilising the estimated posterior mean to estimate the transmitted symbol vector $x_n^{(0)}$.

According to a second aspect of the present invention, there is provided apparatus for controlling a receiver to use linear symbol level equalisation for estimating a transmitted symbol vector $x_n^{(0)}$ in an nth observation window $y_n$ of signals received from multiple users each using a different spreading code, the apparatus comprising a processing system comprising at least one processor and at least one memory storing a computer program. In this aspect the processing system is configured to cause the apparatus to perform at least: utilising an iterative conjugate gradient algorithm to resolve a column vector z that satisfies $Az=b$, where A is a square matrix and b is a column vector, in which a matrix vector product $Ap_k$ used in each respective kth iteration of the iterative conjugate gradient algorithm is computed using at least one fast transform, in which $p_k$ is a conjugate vector for the kth iteration;

estimating a posterior mean $\hat{x}_{LMMSE,n}^{(0)}$ from the column vector z; and utilising the estimated posterior mean to estimate the transmitted symbol vector $x_n^{(0)}$.

The apparatus described above may be the receiver itself, or a detector of the receiver, or a processor running executable software code.

The processing system described above may comprise at least one processor and at least one memory storing computer program code, the processing system being configured to cause the apparatus to perform at least as described above.

According to a third aspect of the present invention, there is provided a computer program that tangibly stores a set of executable instructions which, when executed on a receiver which utilises linear symbol level equalisation for estimating a transmitted symbol vector $x_n^{(0)}$ in an nth observation window $y_n$ of signals received from multiple users each using a different spreading code, causes the receiver to perform steps comprising: utilising an iterative conjugate gradient algorithm to resolve a column vector z that satisfies Az=b, where A is a square matrix and b is a column vector, in which a matrix vector product $Ap_k$ used in each respective kth iteration of the iterative conjugate gradient algorithm is computed using at least one fast transform, in which $p_k$ is a conjugate vector for the kth iteration; estimating a posterior mean $\hat{x}_{LMMSE,n}^{(0)}$ from the column vector z; and utilising the estimated posterior mean to estimate the transmitted symbol vector $x_n^{(0)}$.

The computer program may be stored in or on a computer-readable memory.

Further features and advantages of the invention will become apparent from the following description of preferred embodiments of the invention, given by way of example only, which is made with reference to the accompanying drawings.

DETAILED DESCRIPTION

Before detailing how embodiments of these teachings perform linear symbol-level equalisation and interference suppression, first is detailed a complex-valued system model for a M×N multiple input multiple output (MIMO) CDMA symbol-level equalisation problem. If we consider that M is the number of receive dimensions (receive antennas) and N is the number of transmit dimensions (transmit antennas), the equalisation problem may be described for the nth observation window as:

$$y_n = \sum_{c=0}^{N_{cells}-1} \underbrace{H^{(c)}(\mathrm{diag}(s_n^{(c)}) \otimes I)(I \otimes C^{(c)} \otimes I)}_{k_n^{(c)}} x_n^{(c)} + \varepsilon_n \quad (1)$$

Here, $\otimes$ is the Kronecker product, and diag(a) is the diagonal matrix with the vector a on the diagonal with the following quantities being:

Observation signal vector: $y_n \in C^{M \cdot N_w}$
Equivalent channel matrix of cell c: $H^{(c)} \in C^{M \cdot N_w \times N \cdot N_w}$
Scrambling code sequence of cell c: $S_n^{(c)} \in C^{N_w}$
Spreading code matrix of cell c: $(I \otimes C^{(c)} \otimes I) \in C^{N \cdot N_w \times N \cdot N_w}$
Overall transfer matrix of cell c: $K_n^{(c)} \in C^{M \cdot N_w \times N \cdot N_w}$
Transmitted symbols of cell c: $x_n^{(c)} \in C^{N \cdot N_w}$
Additive thermal AWGN noise: $\varepsilon_n \in C^{M \cdot N_w}$ Here c indicates the signal coming from cell c and $N_{cells}$ is the total number of cells considered. Without loss of generality, the following assumes that cell 0 contains the spreading codes of interest. In this model, n indicates the index of the observation window consisting of $N_w$ chips, with the observation window moving in an overlapping sliding-window fashion. The size of the window considered is a design choice based on the tradeoffs between performance and complexity, but considering a window of e.g. $N_w$=512 chips seems to be a reasonable choice of the window size for WCDMA/HSDPA.

The equivalent convolutive MIMO channel is represented by $H^{(c)}$ and is assumed to remain constant within the window, leading to $H^{(c)}$ having a block-Toeplitz structure with block size M×N. For example, a MIMO setup with 2 transmit and 2 receive antennas and 2 samples per chip therefore leads to M=4 and N=2. The equivalent channel matrix may include linear (spatial) precoding if this is used in the transmission considered, as well as suitable power gain values. The scrambling code over the observation window is given by $s_n$ and may be time-varying and therefore taking on a new value for each observation window considered.

The active spreading codes over the observation window is given by the (generally tall) matrix $$C^{(c)} \triangleq \begin{bmatrix} I \\ 0 \end{bmatrix}^T \tilde{C}^{(c)}$$

where $\tilde{C}^{(c)}$ is a square matrix containing all the possible spreading codes with the size thereof determined by the maximum spreading factor supported directly by the symbol-level equalisation. Any type of spreading code may in principle be used in this representation, but a common choice that is assumed here without loss of generality is the use of orthonormal Walsh-Hadamard spreading codes. Again without loss of generality, it is here assumed that the window size is a multiple of the maximum spreading factor and that the active spreading codes are the same over all the transmit dimensions. However, these requirements may be relaxed, but since the notation would then become cumbersome such relaxed requirements are not chosen here.

The following description of symbol-level equalisation implies that the observation window is at least as long as the highest spreading factor supported. However, as a result of the recursive manner in which e.g. the Walsh-Hadamard spreading codes are constructed, receivers in between that of chip-level and full symbol-level can be directly formulated through the choice of the used spreading code matrix $C^{(c)}$. It then becomes a design issue to determine the maximum spreading factor supported where the full symbol-level structure is exploited. The symbol-level structure of spreading codes that have a larger spreading factor than that which is fully supported by the equaliser will therefore only be captured partly, but it would still capture more of the structure present as compared with that of chip-level equalisation.

In this system model, the vector $x_n^{(c)}$ holds the desired complex-valued transmitted symbols, and $\epsilon_n \sim CN(0, \sigma^2 I)$ contains the additive white Gaussian noise (AWGN) thermal noise, which without loss of generality is here assumed to have the same variance per receive dimension. Approximating any transmitted inter-cell symbols as being zero-mean Gaussian distributed, we get $$y_n = K_n^{(0)} x_n^{(0)} + e_n, \quad e_n \triangleq \sum_{c=1}^{Ncells-1} K_n^{(c)} x_n^{(c)} + \epsilon_n \quad (2)$$

with $e_n \sim CN(0, \Sigma_n)$ where the covariance of the inter-cell plus AWGN term is given by $$\sum_n = \sum_{c=1}^{N_{cells}-1} K_n^{(c)} \sum_{x_n^{(c)}} (K_n^{(c)})^H + \sigma^2 I \quad (3)$$

where $$\sum_{x_n^{(c)}} = \mathrm{diag}\left(\sigma^2_{x_n^{(c)}}\right)$$

assumes that the transmitted symbols in the inter-cell interference are all independent and zero-mean and transmitted with power given by the vector of variances $$\sigma^2_{x_n^{(c)}}.$$

In order to formulate this as a soft-input symbol-level linear minimum mean square error (LMMSE) equalisation problem, the prior on the symbols we are trying to detect may also be approximated as a Gaussian distribution given by $$x_n^{(0)} \sim CN\left(\mu_{x_n^{(0)}}, \sum_{x_n^{(0)}}\right).$$

This soft-input could for instance come from the channel decoder when the equaliser is used in a turbo equalisation setup. Under these assumptions, the soft-input LMMSE symbol estimate is directly given by the posterior mean, which may be computed in inner and outer product form respectively by $$\hat{x}_{LMMSE,n}^{(0)} = \left((K_n^{(0)})^H \sum_n^{-1} K_n^{(0)} + \sum_{x_n^{(0)}}^{-1}\right)^{-1} \left((K_n^{(0)})^H \sum_n^{-1} y_n + \sum_{x_n^{(0)}}^{-1} \mu_{x_n^{(0)}}\right) \quad (4)$$

$$= \mu_{x_n^{(0)}} + \sum_{x_n^{(0)}} (K_n^{(0)})^H \left(K_n^{(0)} + \sum_{x_n^{(0)}} (K_n^{(0)})^H \sum_n\right)^{-1}$$

$$\left(y_n - K_n^{(0)} \mu_{x_n^{(0)}}\right)$$

The posterior variances of the estimated LMMSE symbols, which may be used for generating soft-output in the form of e.g. log likelihood ratios (LLRs), can also be extracted from these expressions since the posterior variances can be found from the inner and outer product expressions respectively as $$\mathrm{diag}\left(\sigma^2_{\hat{x}_n^{(0)}}\right) = \mathrm{diag}\left(\left((K_n^{(0)})^H \sum_n^{-1} K_n^{(0)} + \sum_{x_n^{(0)}}^{-1}\right)^{-1}\right) \quad (5)$$

$$= \left(I - \sum_{x_n^{(0)}} \mathrm{diag}\left((K_n^{(0)})^H \left(\frac{K_n^{(0)} \sum_{x_n^{(0)}} (K_n^{(0)})^H + }{\sum_n}\right)^{-1} K_n^{(0)}\right)\right) \sum_{x_n^{(0)}}$$

In essence, computing the posterior mean and variance for each symbol of the observation window can be used to perform symbol-level LMMSE equalisation, but since $K_n^{(0)}$ and $\Sigma_n$ are time-dependent due to the time-varying scrambling codes, the matrix inverse is time-varying and the linear combining weights therefore require recalculation for each observation window. Since the matrix size is typically very large, performing this matrix inversion in an exact manner for each observation window may not be feasible in practical implementations as there is no apparent structure that may be easily exploited in solving this system of linear equations. Instead, reduced-complexity approximate solutions to this system of linear equations are sought.

As mentioned in the background section, one important sub-class of such linear approximations is chip-level LMMSE equalisation, which in essence assumes that the chips are independent in the channel equalisation. In the special case where the equivalent channel matrix $H^{(0)}$ is orthogonal or all spreading codes are in active use and there is no inter-cell interference, this chip-level LMMSE equalisation approximation can directly be shown to be equivalent to the symbol-level LMMSE equaliser. However, when these conditions are not fulfilled, a loss is incurred by chip-level LMMSE equalisation compared with symbol-level LMMSE equalisation. These teachings are directed toward minimising this loss in a computationally efficient manner, for example.

It is worth noting that the symbol-level structure of one or more inter-cell interferers may be directly captured by the noise covariance matrix $\Sigma_n$. As a result, optimal linear inter-cell interference suppression, exploiting that the inter-cell interference only span a sub-space if all codes are not active, can therefore be incorporated in an optimal manner directly in the symbol-level LMMSE equaliser. When considering inter-cell interference, there is a distinct difference between the inner and outer product formulations since the inner product form of the symbol-level LMMSE equaliser requires the computation of $\Sigma_n^{-1}$, which is also a very large time-varying matrix, whereas the outer product formulation only involves $\Sigma_n$ and therefore seems to be a more attractive candidate from this inter-cell interference point of view. On the other hand, the matrices involved are potentially larger in the outer product formulation and thereby give rise to increased complexity.

In practice, using the matrix $\Sigma_n$ for inter-cell interference rejection requires knowledge of the timing, channel, scrambling code and the power allocated to each of the spreading codes of the interfering cells. The teachings below assume that all such interference parameters are estimated or known.

As noted in the background section, optimal detection in CDMA systems generally requires joint detection over all users and codes, but the search over all possible data symbol combinations is exponentially complex depending on the number of users, which in the past has been impractical to satisfy. Some embodiments of the invention provide linear joint detection based on the LMMSE criteria as this is a reasonable solution in terms of performance and furthermore can serve as a good basis for various interference cancellation schemes, for example. The main challenge of implementing such solutions is the large complexity involved in solving the system of linear equations since the involved matrix size is typically large due to the use of long spreading codes, with typical matrix sizes being in the hundreds or even thousands. Linear joint detection over frequency-selective channels is sometimes called block linear equalisation or symbol-level equalisation and will simply be referred to as symbol-level equalisation in the following description.

Due to the large complexity of exact symbol-level equalisation in CDMA, many approximations have been designed. As was noted above, due to an acceptable overall performance and relatively low complexity, the predominant solution for performing equalisation in practical CDMA systems currently is that of linear chip-level LMMSE equalisation, or a rake receiver. The paper cited in the background section entitled "*FFT-Accelerated Iterative MIMO Chip Equalizer Architecture For CDMA Downlink*" considers the use of the conjugate gradient algorithm for exact solving of the system of linear equations for chip-level LMMSE equalisation. Chip-level equalisation is less complex in that there is no need to recalculate the linear combining weights as long as the channel coefficients remain relatively unchanged. The reduced complexity as compared to symbol-level LMMSE equalisation arises because the chip-level LMMSE equaliser coefficients can be computed once and used for a significant amount of time before they need to be updated.

Even though the performance of chip-level LMMSE equalisation is fairly good, it is well-known that the overall performance can be improved by considering symbol-level LMMSE equalisation instead, but the challenge is to design an implementation that has an acceptable complexity. This is especially the case when the scrambling codes used are time-varying with a period much longer than the used spreading factors, which is the case at least in WCDMA/HSDPA systems, as the symbol-level equalisation coefficients will then have to be computed specifically for each use. However, for systems such as time division synchronous CDMA (TD-SCDMA) where the period of the scrambling code is short, this is less of a problem and various approximations to symbol-level LMMSE equalisation are typically feasible for implementation, as is detailed in the paper noted in the background section entitled "*Comparative study of joint-detection techniques for TD-CDMA based mobile radio systems*". And while the third paper noted in the background section entitled "*Multi-user receiver using conjugate gradient method for wideband CDMA*" uses the conjugate gradient algorithm for solving the linear system of equations that arise for linear joint detection in a CDMA system using non-orthogonal spreading codes over a frequency-flat channel, use of that conjugate gradient algorithm does not lower the complexity of computing the exact solution. Instead it can provide a reduced-complexity implementation if the iterations are terminated early, and therefore results in only an approximate solution. The same lack of exploiting the matrix structure for efficient computation is also the case for the fourth paper noted in the background section entitled "*Multi-user Detection in DS_CDMA Systems: a Conjugate-gradient implementation*" in which a frequency-selective channel is considered.

These teachings detail a computationally efficient way of performing linear symbol-level equalisation, resulting in an implementation complexity for certain embodiments that is significantly lower than that of existing symbol-level equalisation methods and thus can potentially replace many of the chip-level equalisation detectors that are currently in use. The detector and method detailed by non-limiting example in the description below utilises fast transforms as part of the conjugate gradient algorithm to detect signals of one user, which are distinguished from other users by spreading codes, in such a way that both exact and approximate solutions to the symbol-level LMMSE equalisation problem in CDMA can be formulated, for example, in a computationally efficient manner.

An important challenge of implementing symbol-level LMMSE equalisation in CDMA is the complexity of solving the system of linear equations given above by Equation (4). This problem may be formulated as the task of determining the column vector z that fulfills the linear relation $$Az = b \tag{6}$$

where A is a square positive-definite matrix and b is a column vector.

Both of these are given directly from the problem definition in Equation (4) where the inner product formulation is given as $$\hat{x}^{(0)}_{LMMSE,n} = \underbrace{\left((K_n^{(0)})^H \sum_n^{-1} K_n^{(0)} + \sum_{x_n^{(0)}}^{-1}\right)^{-1}}_{A} \underbrace{\left((K_n^{(0)})^H \sum_n^{-1} y_n + \sum_{x_n^{(0)}}^{-1} \mu_{x_n^{(0)}}\right)}_{b} \tag{7}$$

and the outer product formulation is given as $$\hat{x}^{(0)}_{LMMSE,n} = \tag{8}$$

$$\mu_{x_n^{(0)}} + \sum_{x_n^{(0)}} (K_n^{(0)})^H \underbrace{\left((K_n^{(0)}) \sum_{x_n^{(0)}} (K_n^{(0)})^H + \sum_n\right)^{-1}}_{A} \underbrace{(y_n (K_n^{(0)}) \mu_{x_n^{(0)}})}_{b}$$

Since A and b are both uniquely known for a given observation window, the task is to efficiently compute, either exactly or approximately, the solution z using methods of linear algebra that exploit the structure present in the matrix A for efficient computations. However, no simple structure appears to be present in the matrix A that would allow standard methods for structured matrices to be applied, e.g. the framework of displacement rank, making efficient computation challenging.

The teachings herein solve this system of linear equations in an efficient manner by utilising the Conjugate Gradient (CG) algorithm while exploiting fast transforms for computing matrix-vector products, which in turn is the most computationally demanding part of the CG algorithm. The CG algorithm may be described as

---

The Conjugate Gradient (CG) algorithm $r_0 = b - Az_0$
$p_0 = r_0$
FOR k = 0 TO number_of_CG_iterations-1

$$\alpha_k = \frac{r_k^H r_k}{p_k^H A p_k}$$

$$z_{k+1} = z_k + \alpha_k p_k$$

-continued

The Conjugate Gradient (CG) algorithm $$r_{k+1} = r_k - \alpha_k A p_k$$

$$\beta_k = \frac{r_{k+1}^H r_{k+1}}{r_k^H r_k}$$

$$p_{k+1} = r_{k+1} + \beta_k p_k$$

END where $z_k$ is the estimate of z at the kth iteration and $z_0$ is the initial guess used to start the iterations. The vector $r_k$ represents the residual vector that converges towards zero over the iterations, scalars $\alpha_k$ and $\beta_k$ are adaptation coefficients and the vector $p_k$ is the conjugate vector.

In one embodiment the $z_0$ initial guess is based on an estimate obtained from a chip-level LMMSE equaliser, or alternatively it may be based on estimates obtained from the previous observation window.

The CG algorithm in essence finds z in an iterative manner in which the error $\|z-z_k\|_2^2$ decreases over the CG iterations. The error is mathematically guaranteed to be zero after a number of CG iterations given by the size of the matrix A, allowing the CG algorithm to compute the exact solution rather than only an approximation. However, in practice the CG iterations are typically stopped early, in which case an approximate solution is obtained instead. Importantly, the complexity of the CG algorithm is dominated by the complexity of performing the matrix-vector product $Ap_k$ once per CG iteration since all other operations are vector or scalar operations and therefore have significantly smaller complexity for the large matrix sizes characteristic of this linear joint detection problem. Furthermore, since the CG algorithm will in essence be solving a Least Squares (LS) system of linear equations, the resulting Hermitian positive-definite structure in the A matrix should be exploited for improved numerical accuracy. This is often referred to as the CGLS (conjugate gradient least squares) implementation of the CG algorithm.

These teachings reduce the complexity of the CG algorithm to solve the linear system of equations for symbol-level LMMSE equalisation by more efficiently computing the matrix-vector product $Ap_k$. This complexity reduction arises from the realisation that the structure in the matrix A may be exploited to perform the required matrix-vector product $Ap_k$ through the use of efficient fast transforms, specifically the fast Fourier transform and e.g. the fast Walsh-Hadamard transform, as described below for the inner and outer product formulations.

As the channel matrix involved is assumed to have a block-Toeplitz structure due to the time-invariant channel in the considered observation window, the matrix-vector product involving this channel matrix may be implemented in both an exact and an approximate manner based on a block-circulant approximation. Computing the required matrix-vector product with the channel matrix in an exact manner can be done using a linear convolution operation. This operation can be carried out efficiently via a standard technique embedding the block-Toeplitz matrix in a larger block-circulant matrix and using one block-FFT and one block inverse FFT (block-iFFT) operation for computing the result. If a block-circulant approximation to the channel matrix is used instead, the required matrix-vector product may be computed with a circular convolution requiring less FFT/iFFT operations. However, the use of a circular convolution instead of an exact linear convolution results in the CG algorithm only converging to an approximate solution. Below are detailed four distinct combinations involving inner/outer product formulations and linear/circular convolution according to these teachings.

Inner Product Formulation

The matrix A is here according to Equation (7), given by $$A = (K_n^{(0)})^H \sum_n^{-1} K_n^{(0)} + \sum_{x_n^{(0)}}^{-1} \tag{9}$$

where $K_n^{(0)}$ is given by Equation (1). Due to the dependence on the inverse of the noise-interference covariance matrix $\Sigma_n^{-1}$, incorporating the symbol-level structure of an inter-cell interferer is difficult in the inner product formulation and it is therefore assumed for this example that only AWGN is present, i.e.

$$\sum_n^{-1} = \frac{1}{\sigma^2} I.$$

Under this assumption, we have $$A = \frac{1}{\sigma^2}(I \otimes C^{(o)} \otimes I)^H (\mathrm{diag}(s_n^{(0)}) \otimes I)^H \tag{10}$$

$$(H^{(0)})^H H^{(0)} (\mathrm{diag}(s_n^{(0)}) \otimes I)(I \otimes C^{(0)} \otimes I) + \sum_{x_n^{(0)}}^{-1}$$

To compute the matrix-vector product $Ap_k$ required in the CG algorithm in an exact manner using linear convolution, the vector is multiplied onto the matrices from right to left via the following operations:

1. Multiplication with the spreading code matrix containing the active spreading codes, in essence performing a spreading operation of the symbol estimate. If the spreading codes are structured in some manner, this may directly be exploited here, e.g. by the use of a fast Walsh-Hadamard transform for the Walsh-Hadamard codes used in WCDMA/HSDPA.
2. Multiplication by the diagonal scrambling code matrix, in essence performing a scrambling of the chip estimates.
3. Multiplication by the block-banded block-Toeplitz channel matrix $H^{(0)}$, in essence performing a linear convolution by a fast block-Toeplitz matrix-vector product. A standard technique exists for this based on embedding the matrix in a larger block-circulant matrix and using one block-FFT and one block-iFFT operation for computing the result.
4. Multiplication by the block-banded block-Toeplitz channel matrix $(H^{(0)})^H$, in essence performing a linear convolution by a fast block-Toeplitz matrix-vector product. A standard technique exists for this based on embedding the matrix in a larger block-circulant matrix and using one block-FFT and one block-iFFT operation for computing the result.
5. Multiplication by the diagonal descrambling code matrix, in essence performing a descrambling of the chip estimates.

6. Multiplication with the despreading code matrix containing the active spreading codes, in essence performing a despreading operation of the chip estimate. If the spreading codes are structured in some manner, this may directly be exploited here, e.g. by the use of a fast Walsh-Hadamard transform for the Walsh-Hadamard codes used in WCDMA/HSDPA.
7. Compute $$\sum_{x_n^{(0)}}^{-1} p_k$$

by scalar multiplication with $$\mathrm{diag}\!\left(\sigma_{x_n^{(0)}}^{-2}\right)$$

and add to the scaled result of the previous step

If an approximate solution based on circular convolution is targeted instead, the block-Toeplitz channel matrix in Equation (10) is approximated by a block-circulant matrix given by $$H^{(c)} \approx (V \otimes I)^H D^{(c)} (V \otimes I) \qquad (11)$$

where V is the normalised discrete Fourier transform (DFT) matrix of size $N_w$ and $D^{(c)}$ is a block-diagonal matrix containing the Fourier transform of the equivalent channel impulse response found by the first block-column of $\sqrt{N_w}(V \otimes I)H^{(c)}$, with $(V \otimes I)$ being the block-FFT operation.

This block-circulant approximation is expected to provide a good approximation as long as the window size is large compared to the delay spread of the channel and when the channel can be considered constant within the window. The choice of window size is therefore an important parameter in the quality of this approximation.

Inserting this block-circulant approximation in Equation (10) yields $$A = \frac{1}{\sigma^2}(I \otimes C^{(0)} \otimes I)^H (\mathrm{diag}(s_n^{(0)}) \otimes I)^H (V \otimes I)^H \qquad (12)$$

$$(D^{(0)})^H D^{(0)} (V \otimes I)(\mathrm{diag}(s_n^{(0)}) \otimes I)(I \otimes C^{(0)} \otimes I) + \sum_{x_n^{(0)}}^{-1}$$

The matrix-vector multiplications involving the block-banded block-Toeplitz channel matrix $H^{(0)}$ (steps 3 and 4 in the description above) can therefore be replaced with operations directly in the frequency-domain as follows:
1. Multiplication with the spreading code matrix containing the active spreading codes, in essence performing a spreading operation of the symbol estimate. If the spreading codes are structured in some manner, this may directly be exploited here, e.g. by the use of a fast Walsh-Hadamard transform for the Walsh-Hadamard codes used in WCDMA/HSDPA.
2. Multiplication by the diagonal scrambling code matrix, in essence performing a scrambling of the chip estimates.
3. Perform a block-FFT operation
4. Multiply by the block-diagonal matrix $(D^{(0)})^H D^{(0)}$
5. Perform a block-iFFT operation
6. Multiplication by the diagonal descrambling code matrix, in essence performing a descrambling of the chip estimates.
7. Multiplication with the despreading code matrix containing the active spreading codes, in essence performing a despreading operation of the chip estimate. If the spreading codes are structured in some manner, this may directly be exploited here, e.g. by the use of a fast Walsh-Hadamard transform for the Walsh-Hadamard codes used in WCDMA/HSDPA.
8. Compute $$\Sigma_{x_n^{(0)}}^{-1} p_k$$

by scalar multiplication with $$\mathrm{diag}\!\left(\sigma_{x_n^{(0)}}^{-2}\right)$$

and add to the scaled result of the previous step

Outer Product Formulation

The matrix A is here according to Equation (8) given by $$A = K_n^{(0)} \Sigma_{x_n^{(0)}} (K_n^{(0)})^H + \Sigma_n \qquad (13)$$

where $K_n^{(0)}$ is given by Equation (1). Since any inter-cell interference is assumed to have the same signal structure, we may rewrite this as $$A = \sum_{c=0}^{N_{cells}-1} H^{(c)}(\mathrm{diag}(s_n^{(c)}) \otimes I)(I \otimes C^{(c)} \otimes I) \qquad (14)$$

$$\Sigma_{x_n^{(c)}} (I \otimes C^{(c)} \otimes I)^H (\mathrm{diag}(s_n^{(c)}) \otimes I)^H (H^{(c)})^H + \sigma^2 I$$

To compute the matrix-vector product $a_k = A p_k$ required in the CG algorithm, the vector is therefore multiplied onto the matrices in Equation (14) for each cell from right to left via the following operations
1. Initialise the result vector $a_k$ to zero.
2. FOR c=0 TO $N_{cells}-1$
   a. Multiplication by the block-banded block-Toeplitz channel matrix $(H^{(c)})^H$, in essence performing a linear convolution by a fast block-Toeplitz matrix-vector product. A standard technique exists for this based on embedding the matrix in a larger block-circulant matrix and using one block-FFT and one block-iFFT operation for computing the result.
   b. Multiplication by the diagonal descrambling code matrix, in essence performing a descrambling of the chip estimates.
   c. Multiplication with the despreading code matrix containing the active spreading codes, in essence performing a despreading operation of the chip estimate. If the spreading codes are structured in some manner, this may directly be exploited here, e.g. by the use of a fast Walsh-Hadamard transform for the Walsh-Hadamard codes used in WCDMA/HSDPA.

d. Multiply by the diagonal matrix $$\Sigma_{x_n^{(c)}}.$$

e. Multiplication with the spreading code matrix containing the active spreading codes, in essence performing a spreading operation of the symbol estimate. If the spreading codes are structured in some manner, this may directly be exploited here, e.g. by the use of a fast Walsh-Hadamard transform for the Walsh-Hadamard codes used in WCDMA/HSDPA.
f. Multiplication by the diagonal scrambling code matrix, in essence performing a scrambling of the chip estimates.
g. Multiplication by the block-banded block-Toeplitz channel matrix $H^{(c)}$, in essence performing a linear convolution by a fast block-Toeplitz matrix-vector product. A standard technique exists for this based on embedding the matrix in a larger block-circulant matrix and using one block-FFT and one block-iFFT operation for computing the result.
h. Add the result from the previous step to the result vector $a_k$.
3. END
4. Add $\sigma^2$ to all elements of the result vector $a_k$.

If an approximate solution based on circular convolution is targeted instead, the block-Toeplitz channel matrix in Equation (14) is approximated by a block-circulant matrix given by $$H^{(c)} \cong (V \otimes I)^H D^{(c)} (V \otimes I) \qquad (15)$$

where V is the normalised DFT matrix of size $N_w$ and $D^{(c)}$ is a block-diagonal matrix containing the Fourier transform of the equivalent channel impulse response found by the first block-column of $\sqrt{N_w}(V \otimes I)H^{(c)}$ with $(V \otimes I)$ being the block-FFT operation.

This block-circulant approximation is expected to provide a good approximation as long as the window size is large compared to the delay spread of the channel and when the channel can be considered constant within the window. The choice of window size is therefore an important parameter in the quality of this approximation.

Due to the block-circulant assumption, the DFT matrix is a common basis and can be moved outside of the matrix inversion in Equation (8). By defining Fourier transformed version of the variables $$\tilde{K}_n^{(c)} \triangleq (V \otimes I) K_n^{(c)} = D^{(c)} (V \otimes I)(\text{diag}(s_n^{(c)}) \otimes I)$$
$$(I \otimes C^{(c)} \otimes I)$$

$$\tilde{y}_n \triangleq (V \otimes I) y_n \qquad (16)$$

we can rewrite Equation (8) as $$\hat{x}_{LMMSE,n}^{(0)} = \qquad (17)$$

$$\mu_{x_n^{(0)}} + \Sigma_{x_n^{(0)}} (\tilde{K}_n^{(0)})^H \underbrace{\left( \sum_{c=0}^{N_{cells}-1} \tilde{K}_n^{(c)} \Sigma_{x_n^{(c)}} (\tilde{K}_n^{(c)})^H + \sigma^2 I \right)^{-1}}_{A} \underbrace{(\tilde{y}_n - \tilde{K}_n^{(0)} \mu_{x_n^{(0)}})}_{b}$$

where it is assumed that any inter-cell interference has the same basic structure as that of the desired cell.

Writing out the A matrix in Equation (17) therefore results in $$A = \sum_{c=0}^{N_{cells}-1} D^{(c)}(V \otimes I)(\text{diag}(s_n^{(c)}) \otimes I)(I \otimes C^{(c)} \otimes I) \qquad (18)$$
$$\Sigma_{x_n^{(c)}}(I \otimes C^{(c)} \otimes I)^H (\text{diag}(s_n^{(c)}) \otimes I)^H ((V \otimes I))^H (D^{(c)})^H + \sigma^2 I$$

To compute the matrix-vector product $a_k = A p_k$ required in the CG algorithm, the vector is therefore multiplied onto the matrices in Equation (18) for each matrix from right to left via the following operations:
1. Initialise the result vector $a_k$ to zero.
2. FOR c=0 TO $N_{cells}-1$
   a. Multiply by the block-diagonal matrix $(D^{(c)})^H$
   b. Perform a block-iFFT operation
   c. Multiplication by the diagonal descrambling code matrix, in essence performing a descrambling of the chip estimates.
   d. Multiplication with the despreading code matrix containing the active spreading codes, in essence performing a despreading operation of the chip estimate. If the spreading codes are structured in some manner, this may directly be exploited here, e.g. by the use of a fast Walsh-Hadamard transform for the Walsh-Hadamard codes used in WCDMA/HSDPA.
   e. Multiply by the diagonal matrix $$\Sigma_{x_n^{(c)}}.$$

f. Multiplication with the spreading code matrix containing the active spreading codes, in essence performing a spreading operation of the symbol estimate. If the spreading codes are structured in some manner, this may directly be exploited here, e.g. by the use of a fast Walsh-Hadamard transform for the Walsh-Hadamard codes used in WCDMA/HSDPA.
   g. Multiplication by the diagonal scrambling code matrix, in essence performing a scrambling of the chip estimates.
   h. Perform a block-FFT operation
   i. Multiply by the block-diagonal matrix $D^{(c)}$
   j. Add the result from the previous step to the result vector $a_k$.
3. END
4. Add $\sigma^2$ to all elements of the result vector $a_k$.

Preconditioning

For reasons of convergence rate and/or numerical reasons, it may be desirable to instead formulate the CG algorithm generally as (PA)z=Pb where P can be any square full-rank matrix which may be used for the purpose of preconditioning and/or scaling, e.g. for scaling according to $P=\sigma^2 I$. Such a representation is mathematically equivalent, but since the convergence rate of the CG algorithm is dependent on the eigenvalue spread of the effective matrix, it is advantageous to use a preconditioning matrix P that results in a smaller eigenvalue spread. However, determining a good preconditioner in an efficient way is in itself a challenging problem and the choice of which preconditioning to use is therefore a trade off between the complexity spent in determining and applying preconditioning and the improved convergence rate of the CG algorithm. Standard techniques exists for preconditioning the CG algorithm, e.g. using the inverse of the diagonal or block-diagonal elements of A as a preconditioner, and such standard approaches will therefore not be detailed further here. However, the usage of a chip-level LMMSE equaliser for preconditioning in the outer product formulation is considered in more detail here.

In general, this approach exploits that a chip-level LMMSE equaliser having priors given by $x_n^{(c)} \sim CN(0,I)$ solves approximately the same problem as the symbol-level LMMSE equaliser, but does so at a much lower complexity while allowing the associated matrix to be used as a preconditioner in the outer product formulation. For the outer product formulation with linear convolution given by Equations (8) and (14), such a preconditioner may be given as $$P = (\Sigma_{c=0}^{Ncells-1} H^{(c)}(H^{(c)})^H + \sigma^2 I)^{-1} \quad (19)$$

Due to the block-Toeplitz structure present in $P^{-1}$ in Equation (19), its inverse may be found efficiently using well-known standard techniques for this specific matrix inversion problem. For the outer product formulation using circular convolution given by Equations (17) and (18), the preconditioner may be described by $$P = (\Sigma_{c=0}^{Ncells-1} D^{(c)}(D^{(c)})^H + \sigma^2 I)^{-1} \quad (20)$$

Due to the block-diagonal structure present in $P^{-1}$ in Equation (20), its inverse may be found directly via independent matrix inversion of each block.

Embodiments of these teachings provide technical advantages. For example, some embodiments enable an efficient implementation of symbol-level equalisation based on fast transforms which may result in better throughput at the physical-layer when cells are partially loaded or MIMO operation is employed, i.e. when non-orthogonal intra-cell interference is present. In some embodiments, the use of symbol-level processing may allow efficient interference rejection of inter-cell interference to be directly integrated into the equalisation through symbol-level whitening. This may have a bit higher complexity than traditional chip-level equalisation techniques but the above advantages are seen to outweigh that greater complexity.

Figure 1:
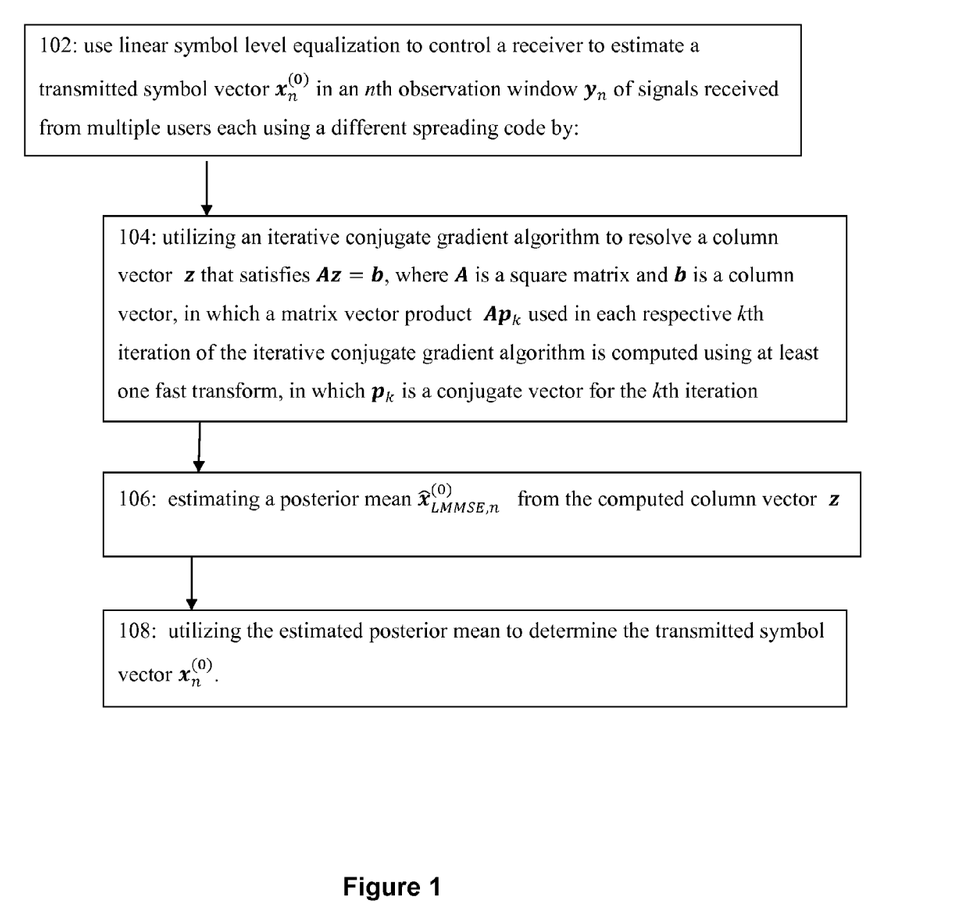
FIG. 1 shows a logic flow diagram illustrating schematically the operation of a method, and a result of execution of computer program instructions embodied on a computer readable memory, for operating a receiver and/or detector component of a receiver according to an example embodiment of these teachings.

FIG. 1 is a logic flow diagram which may be considered to illustrate the operation of a method, and a result of execution of a computer program stored in a computer readable memory, and a specific manner in which components of an electronic device such as a UE or a network access node or one or more components thereof are configured to cause that electronic device to operate, according to an example embodiment of these teachings. The various blocks shown in FIG. 1 may also be considered as a plurality of coupled logic circuit elements constructed to carry out the associated function(s), or specific result of strings of computer program code stored in a memory. As will be noted, not all portions of FIG. 1 are essential for practising these teachings.

Such blocks and the functions they represent are non-limiting examples, and may be practised in various components, such as integrated circuit chips and modules, and the exemplary embodiments of this invention may be realised in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with some example embodiments of this invention.

Block 102 of FIG. 1 sets the environment, in which an electronic device uses linear symbol level equalisation to control a receiver to estimate a transmitted symbol vector $x_n^{(o)}$ in an nth observation window $y_n$ of signals received from multiple users each using a different spreading code. The signaling an nth observation window $y_n$ is modeled for example using Equation (1) or (2).

How this is done is summarised by the remainder of FIG. 1. Specifically, at block 104 the receiver or a detector of the receiver utilises an iterative conjugate gradient algorithm to resolve a column vector z that satisfies Az=b such as is shown at Equation (6). A is a square matrix and b is a column vector, and a matrix vector product $Ap_k$ used in each respective kth iteration of the iterative conjugate gradient algorithm is computed using at least one fast transform. In that matrix vector product, $p_k$ is a conjugate vector for the kth iteration. The iterative CG algorithm is shown following Equation (8) above and in each iteration the matrix vector product $Ap_k$ is used multiple times. As an equivalent alternative, the CG algorithm uses (PA)z=Pb, to resolve the column vector z as detailed above when preconditioning is used, and in this case P is a square full-rank preconditioning matrix whose inverse is solved directly via independent matrix inversion of the blocks at Equations (19) or (20) in different embodiments.

Continuing at FIG. 1, then at block 106 the receiver or detector estimates a posterior mean $\hat{x}_{LMMSE,n}^{(o)}$ from the computed column vector z. The posterior mean $\hat{x}_{LMMSE,n}^{(o)}$ can be solved for via Equation (4), or more particularly via Equation (7) for the two techniques for solving the inner product of the square matrix A and the column vector b detailed above following Equations (10) and (12); or via Equation (8) for the two techniques for solving the outer product of the square matrix A and the column vector b detailed above following Equations (14) and (15) above. In those detailed descriptions of solving the inner and outer products are noted where the fast transforms can be done to reduce the complexity of solving the matrix vector product $Ap_k$, some being fast Walsh-Hadamard transforms and some being fast Fourier transforms. Multiple transforms or only one can be used in any given implementation. In both the inner and outer product techniques, the conjugate gradient algorithm resolves a column vector z from which $\hat{x}_{LMMSE,n}^{(o)}$ may be computed.

And finally at block 108 of FIG. 1 the receiver or detector utilises the estimated posterior mean to determine (estimate) the transmitted symbol vector $x_n^{(o)}$.

Figure 2:
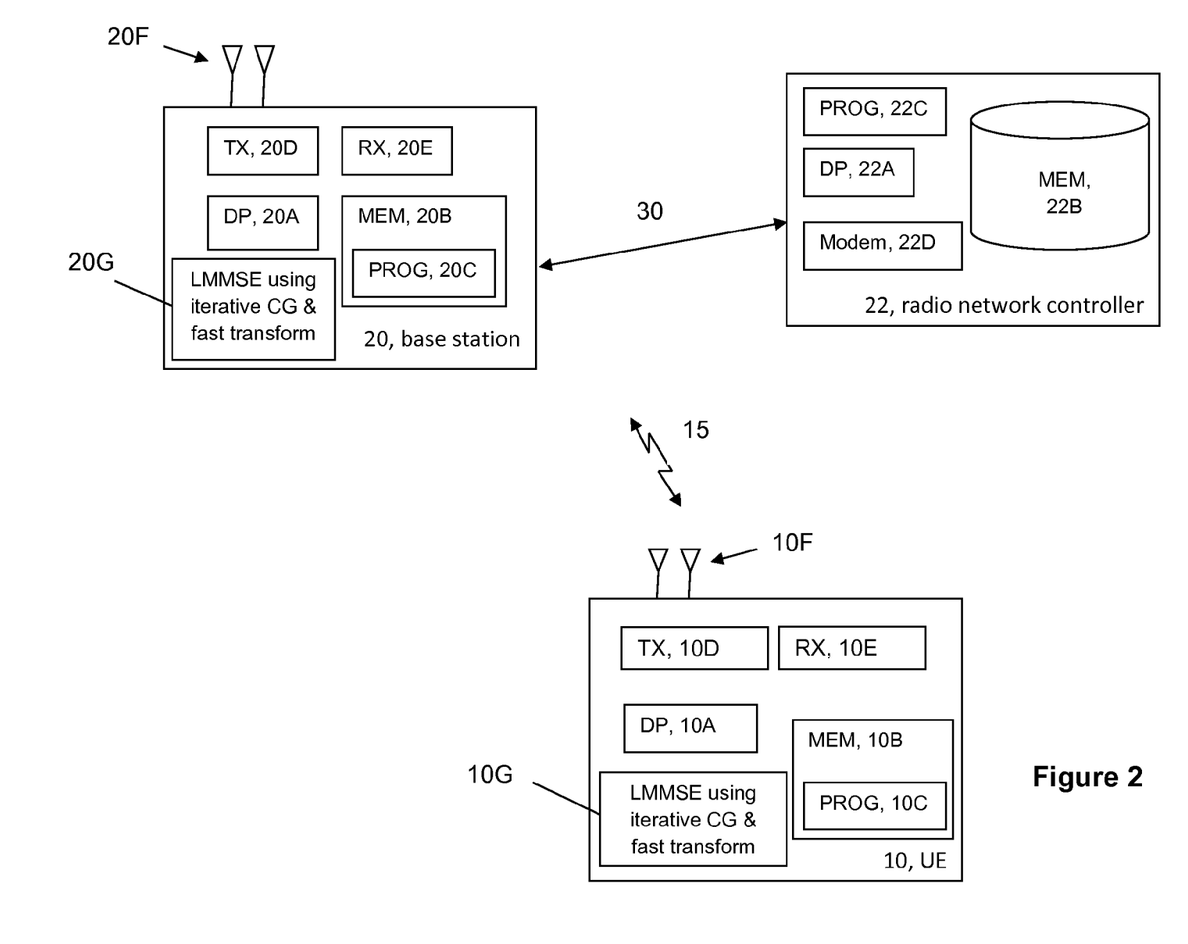
FIG. 2 shows a simplified schematic block diagram of a user equipment in communication with an access node of a cellular network, which are non-limiting exemplary electronic devices suitable for use in practicing an example embodiment of these teachings.

Reference is now made to FIG. 2 for illustrating a simplified block diagram of various electronic devices and apparatus that are suitable for use in practising some example embodiments of this invention. In FIG. 2 there is a base transceiver station 20 or more generally a network access node such as a Node B in the Universal Terrestrial Radio Access Network (UTRAN) system or an eNodeB in the Evolved UTRAN (E-UTRAN) system which is adapted for communication over a wireless link 15 with an apparatus 10 such as a mobile terminal or user equipment UE. The UE 10 may be in contact with multiple cells at once though FIG. 2 illustrates only its serving cell 20. The illustrated wireless link 15 may represent more than one logical and/or physical channels/bearers. The base station 20 is further communicatively coupled via a data and control link 30 to a higher network node, such as a radio network controller RNC 22 in the case of the UTRAN system, or a mobility management entity/serving gateway MME/S-GW in the case of the E-UTRAN system.

The UE 10 includes processing means such as at least one data processor (DP) 10A, storing means such as at least one computer-readable memory (MEM) 10B storing at least one computer program (PROG) 10C, and communicating means such as a transmitter TX 10D and a receiver RX 10E for bidirectional wireless communications with the base station 20 via one or more antennas 10F. Within the memory 10B of the UE 10 but shown separately as reference number 10G is also a computer program and a detector or both for implementing a symbol-level LMMSE using an iterative conjugate gradient algorithm and at least one fast transform as detailed above and summarised at FIG. 1, for the multi-user spread spectrum signals it receives.

The base station 20 also includes processing means such as at least one data processor (DP) 20A, storing means such as at least one computer-readable memory (MEM) 20B storing at least one computer program (PROG) 20C, and communicating means such as a transmitter TX 20D and a receiver RX 20E for bidirectional wireless communications with its associated user devices 10 via one or more antennas 20F. The base station 20 also has stored in its memory at 20G a computer program and a detector or both for implementing a symbol-level LMMSE using an iterative conjugate gradient algorithm and at least one fast transform as detailed above and summarised at FIG. 1, for the multi-user spread spectrum signals it receives.

For completeness the higher network node 22 is also shown to include a DP 22A, and a MEM 22B storing a PROG 22C, and additionally a modem 22D for communicating with at least the base station 20. While not particularly illustrated for the UE 10 or the base station 20, those devices are also assumed to include as part of their wireless communicating means a modem which may in one exemplary but non limiting embodiment be inbuilt on an RF front end chip so as to carry the respective TX 10D/20D and RX 10E/20E.

At least one of the PROGs 10C, 20C in the UE 20 and/or in the base station 20 is assumed to include program instructions that, when executed by the associated DP 10A, 20A, enable the device to operate in accordance with the exemplary embodiments of this invention as detailed more fully above. In this regard some example embodiments of this invention may be implemented at least in part by computer software stored on the MEM 10B, 20B which is executable by the DP 10A, 20A of the respective devices 10, 20; or by hardware; or by a combination of tangibly stored software and hardware (and tangibly stored firmware). Electronic devices implementing some embodiments of the invention may not be the entire UE 10 or base station 20, but some example embodiments may be implemented by one or more components of same such as the above described tangibly stored software, hardware, firmware and DP, or a system on a chip SOC such as a RF front end chip or a receiver or a detector of a receiver. Other implementations include an application specific integrated circuit ASIC or a digital signal processor DSP or a modem.

Some embodiments of the UE 10 can include, but are not limited to: cellular telephones, data cards, USB dongles, laptop computers, personal portable digital devices having wireless communication capabilities including but not limited to laptop/palmtop/tablet computers, digital cameras and music devices, and Internet appliances.

Various embodiments of the computer readable MEM 10B, 20B include any data storage technology type that is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 10A, 20A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the WCDMA and TD-SCDMA systems, it should be appreciated that the exemplary embodiments of this invention are not limited for use with only this one particular type of wireless communication system, and that they may be used to advantage in other wireless communication systems such as for example E-UTRAN, or in others which utilise spreading codes to distinguish different transmitter signals from one another.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for using linear symbol level equalisation to control a receiver to estimate a transmitted symbol vector $x_n^{(0)}$ in an nth observation window $y_n$ of signals received from multiple users each using a different spreading code, the method comprising:
    calculating using an iterative conjugate gradient algorithm to resolve a column vector z that satisfies Az=b, where A is a square matrix and b is a column vector, in which a matrix vector product $Ap_k$ used in each respective kth iteration of the iterative conjugate gradient algorithm is computed using at least one fast transform operation, in which $p_k$ is a conjugate vector for the kth iteration;
    estimating a posterior mean $\hat{x}_{LMMSE,n}^{(0)}$, wherein LMMSE is a linear minimum mean squared error, from the column vector z; and
    estimating the transmitted symbol vector $x_n^{(0)}$ using the estimated posterior mean.

2. The method according to claim 1, in which the posterior mean $\hat{x}_{LMMSE,n}^{(0)}$ is estimated from the square matrix A and the column vector b, where A has an inner product form which includes computation of $\Sigma_n^{-1}$.

3. The method according to claim 2, in which the matrix vector product $Ap_k$ is computed by:
    a) multiplying the vector $p_k$ with a spreading code matrix containing all active spreading codes;
    b) multiplying the result of part a) by a diagonal scrambling code matrix;
    c) multiplying the result of part b) by a block-banded block-Toeplitz channel matrix $H^{(0)}$;
    d) multiplying the result of part c) by the block-banded block-Toeplitz channel matrix $(H^{(0)})^H$;
    e) multiplying the result of part d) by a diagonal descrambling code matrix;
    f) multiplying the result of part e) with a despreading code matrix containing the active spreading codes; and
    g) computing $$\sum_{x_n^{(0)}}^{-1} p_k$$

by scalar multiplication with $$\mathrm{diag}\left(\sigma^{-2}_{x_n^{(0)}}\right)$$

and adding the result to the scaled result of part f), where $$\Sigma^{-1}_{x_n^{(0)}}$$

is an inverse covariance matrix;
in which the at least one fast transform operation is a fast Walsh-Hadamard transform operation utilized in part a) and/or in part f).

4. The method according to claim 3, in which part c) and/or part d) utilize a fast Fourier transform operation and/or fast inverse Fourier transform operation.

5. The method according to claim 3, in which part c) and/or part d) utilize a block fast Fourier transform operation and/or block fast inverse Fourier transform operation.

6. The method according to claim 2, in which the matrix vector product $Ap_k$ is computed by:
 a) multiplying the vector $p_k$ with a spreading code matrix containing all active spreading codes;
 b) multiplying the result of part a) by a diagonal scrambling code matrix;
 c) perform a fast Fourier transform operation on the result of part b);
 d) multiplying the transformed result from part c) by a block-diagonal matrix $(D^{(0)})^H D^{(0)}$;
 e) performing an inverse fast Fourier transform operation on the result of part d);
 f) multiplying the result of part e) by a diagonal descrambling code matrix;
 g) multiplying the result of part f) with a despreading code matrix containing the active spreading codes; and
 h) computing $$\Sigma^{-1}_{x_n^{(0)}} p_k$$

by scalar multiplication with $$\mathrm{diag}\left(\sigma^{-2}_{x_n^{(0)}}\right)$$

and adding the result to the scaled result of part g), where $$\Sigma^{-1}_{x_n^{(0)}}$$

is an inverse covariance matrix;
in which the at least one fast transform operation is a fast Walsh-Hadamard transform operation utilized in part a) and/or in part g), and/or the fast Fourier transform operation utilized in part c) and/or the fast inverse Fourier transform operation utilized in part e).

7. The method according to claim 6, in which the fast Fourier transform operation in part c) is a block fast Fourier transform operation and/or the inverse fast Fourier transform operation in part e) is a block inverse fast Fourier transform operation.

8. The method according to claim 1, in which the posterior mean $\hat{x}_{LMMSE,n}^{(0)}$ is estimated from the square matrix A and the column vector b, where A has an outer product form which includes computation $\Sigma_n$.

9. The method according to claim 8, in which the matrix-vector product is computed as a result vector $a_k = Ap_k$ by:
 a) initialising the result vector $a_k$ to zero;
 b) for each cell indexed as $c=0$ to $N_{cells}-1$:
  i. multiplying the vector $p_k$ by a block-banded block-Toeplitz channel matrix $(H^{(c)})^H$;
  ii. multiplying the result of part i by a diagonal descrambling code matrix;
  iii. multiplying the result of part ii with a despreading code matrix containing all active spreading codes;
  iv. multiplying the result of part iii by a diagonal covariance matrix $$\Sigma_{x_n^{(c)}};$$

v. multiplying the result of part iv with a spreading code matrix containing all active spreading codes;
  vi. multiplying the result of part v by a diagonal scrambling code matrix;
  vii. multiplying the result of part vi by a block-banded block-Toeplitz channel matrix $H^{(c)}$;
  viii. adding the result from part vii to the result vector $a_k$; and
 c) adding variance $\sigma^2$ to all elements of the result vector $a_k$.
in which the at least one fast transform operation is a fast Walsh-Hadamard transform operation utilized in part iii and/or in part v.

10. The method according to claim 9, in which part i and/or part vii utilize a fast Fourier transform operation and/or fast inverse Fourier transform operation.

11. The method according to claim 9, in which part i and/or part vii utilize a block fast Fourier transform operation and/or block fast inverse Fourier transform operation.

12. The method according to claim 9, comprising preconditioning the iterative conjugate gradient algorithm with a square full-rank matrix P according to $$P = \left(\sum_{c=0}^{N_{cells}-1} H^{(c)}(H^{(c)})^H + \sigma^2 I\right)^{-1};$$

wherein $N_{cells}$ is a total number of cells considered,
 $\sigma^2$ is variance of additive white Gaussian noise AWGN
 $H^{(c)}$ is a block-circulant matrix, and
 I is an identity matrix.

13. A method according to claim 8, in which the matrix-vector product is computed as a result vector $a_k = Ap_k$ by:
 a) initialising the result vector $a_k$ to zero;
 b) for each cell indexed as $c=0$ to $N_{cells}-1$:
  i. multiplying the vector $p_k$ by a block-diagonal matrix $(D^{(c)})^H$;
  ii. performing an inverse fast Fourier transform operation on the result of part i;

iii. multiplying the result of part ii by the diagonal descrambling code matrix;
iv. multiplying the result of part iii with a despreading code matrix containing all active spreading codes;
v. multiplying the result of part iv by a diagonal covariance matrix $$\sum_{x_n^{(c)}};$$

vi. multiplying the result of part v with a spreading code matrix containing all active spreading codes;
vii. multiplying the result of part vi by a diagonal scrambling code matrix;
viii. perform a fast Fourier transform operation on the result of part vii;
ix. multiplying the result of part viii by a block-diagonal matrix $D^{(c)}$
x. adding the result from part ix to the result vector $a_k$; and
c) adding variance $\sigma^2$ to all elements of the result vector $a_k$;
in which the at least one fast transform operation is a fast Walsh-Hadamard transform operation utilized in part iv and/or in part vi, and/or the fast Fourier transform operation utilized in part ii and/or the fast inverse Fourier transform operation utilized in part viii.

14. The method according to claim 13, in which the inverse fast Fourier transform operation in part ii is a block inverse fast Fourier transform operation and/or the fast Fourier transform operation in part viii is a block fast Fourier transform operation.

15. The method according to claim 13, comprising preconditioning the iterative conjugate gradient algorithm with a square full-rank matrix P according to $$P = \left( \sum_{c=0}^{N_{cells}-1} D^{(c)}(D^{(c)})^H + \sigma^2 I \right)^{-1}$$

wherein $N_{cells}$ is a total number of cells considered,
$D^{(c)}$ is a block-diagonal matrix for cell c,
$\sigma^2$ is variance of additive white Gaussian noise AWGN, and
I is an identity matrix.

16. An apparatus for controlling a receiver to use linear symbol level equalisation for estimating a transmitted symbol vector $x_n^{(0)}$ in an nth observation window $y_n$ of signals received from multiple users each using a different spreading code, the apparatus comprising:
a processing system comprising at least one processor and at least one memory storing a computer program, where the processing system is configured to cause the apparatus to
utilize an iterative conjugate gradient algorithm to resolve a column vector z that satisfies Az=b, where A is a square matrix and b is a column vector, in which a matrix vector product $Ap_k$ used in each respective kth iteration of the iterative conjugate gradient algorithm is computed using at least one fast transform operation, in which $p_k$ is a conjugate vector for the kth iteration;
estimate a posterior mean $\hat{x}_{LMMSE,n}^{(0)}$; wherein LMMSE is a linear minimum mean squared error, from the column vector z; and
estimate the transmitted symbol vector $x_n^{(0)}$ using the estimated posterior mean.

17. The apparatus according to claim 16, in which the posterior mean $\hat{x}_{LMMSE,n}^{(0)}$ is estimated from the square matrix A and the column vector b, where A has an inner product form which includes computation of $\Sigma_n^{-1}$.

18. The apparatus according to claim 17, in which the matrix vector product $Ap_k$ is computed by:
a) multiplying the vector $p_k$ with a spreading code matrix containing all active spreading codes;
b) multiplying the result of part a) by a diagonal scrambling code matrix;
c) multiplying the result of part b) by a block-banded block-Toeplitz channel matrix $H^{(0)}$;
d) multiplying the result of part c) by the block-banded block-Toeplitz channel matrix $(H^{(0)})^H$;
e) multiplying the result of part d) by a diagonal descrambling code matrix;
f) multiplying the result of part e) with a despreading code matrix containing the active spreading codes; and
g) computing $$\sum_{x_n^{(0)}}^{-1} p_k$$

by scalar multiplication with $$\text{diag}\left(\sigma_{x_n^{(0)}}^{-2}\right)$$

and adding the result to the scaled result of part f), where $$\sum_{x_n^{(0)}}^{-1}$$

is an inverse covariance matrix;
in which the at least one fast transform operation is a fast Walsh-Hadamard transform operation utilized in part a) and/or in part f).

19. The apparatus according to claim 17, in which the matrix vector product $Ap_k$ is computed by:
a) multiplying the vector $p_k$ with a spreading code matrix containing all active spreading codes;
b) multiplying the result of part a) by a diagonal scrambling code matrix;
c) perform a fast Fourier transform operation on the result of part b);
d) multiplying the transformed result from part c) by a block-diagonal matrix $(D^{(0)})^H D^{(0)}$,
e) performing an inverse fast Fourier transform operation on the result of part d);
f) multiplying the result of part e) by a diagonal descrambling code matrix;
g) multiplying the result of part f) with a despreading code matrix containing the active spreading codes; and h) computing $$\sum_{x_n^{(0)}}^{-1} p_k$$

by scalar multiplication with $$\mathrm{diag}\left(\sigma_{x_n^{(0)}}^{-2}\right)$$

and adding the result to the scaled result of part g), where $$\sum_{x_n^{(0)}}^{-1}$$

is an inverse covariance matrix;
in which the at least one fast transform operation is a fast Walsh-Hadamard transform operation utilized in part a) and/or in part g), and/or the fast Fourier transform operation utilized in part c) and/or the fast inverse Fourier transform operation in part e).

20. A non-transitory computer readable memory storing a set of executable instructions which, when executed on a receiver which utilizes linear symbol level equalisation for estimating a transmitted symbol vector $x_n^{(0)}$ in an nth observation window $y_n$ of signals received from multiple users each using a different spreading code, causes the receiver to perform steps comprising:

calculating using an iterative conjugate gradient algorithm to resolve a column vector z that satisfies Az=b, where A is a square matrix and b is a column vector, in which a matrix vector product $Ap_k$ used in each respective kth iteration of the iterative conjugate gradient algorithm is computed using at least one fast transform, in which $p_k$ is a conjugate vector for the kth iteration;

estimating a posterior mean $\hat{x}_{LMMSE,n}^{(0)}$, wherein LMMSE is a linear minimum mean squared error, from the column vector z; and estimating the transmitted symbol vector $x_n^{(0)}$ using the estimated posterior mean.

* * * * *